US006118917A

United States Patent [19]

Lee et al.

[11] Patent Number: 6,118,917

[45] Date of Patent: Sep. 12, 2000

[54] OPTICAL FIBER PASSIVE ALIGNMENT APPARATUS USING ALIGNMENT PLATFORM

[75] Inventors: Hyung-jae Lee, Yongin; Byong-gwon You, Daejeon; Yong-woo Lee, Yongin; Tae-hyung Rhee, Sungnam, all of Rep. of Korea

[73] Assignee: Samsung Electronics Co., Ltd., Kyungki-do, Rep. of Korea

[21] Appl. No.: 09/124,981

[22] Filed: Jul. 30, 1998

[30] Foreign Application Priority Data

Jul. 31, 1997 [KR] Rep. of Korea ...................... 97-36556

[51] Int. Cl.[7] ....................................................... G02B 6/30

[52] U.S. Cl. ................................................ 385/49; 385/52

[58] Field of Search ................................. 385/39, 49, 52, 385/59, 65, 83

[56] References Cited

U.S. PATENT DOCUMENTS

| | | | |
|---|---|---|---|
| 5,475,775 | 12/1995 | Kragl et al. | 385/39 |
| 5,574,811 | 11/1996 | Bricheno et al. | 385/52 |
| 5,641,612 | 6/1997 | Lee et al. | 385/39 |
| 5,703,973 | 12/1997 | Mettler et al. | 385/14 |

FOREIGN PATENT DOCUMENTS

| | | |
|---|---|---|
| 0532470 | 3/1993 | European Pat. Off. . |
| 0718649 | 6/1996 | European Pat. Off. . |

*Primary Examiner*—John D. Lee
*Assistant Examiner*—Sarah N Song
*Attorney, Agent, or Firm*—Leydig, Voit & Mayer, Ltd.

[57] ABSTRACT

An optical fiber passive alignment apparatus for passively aligning optical fibers with input/output optical waveguides of an integrated optical device includes an optical fiber array block on which the optical fibers are mounted with a uniform spacing and having alignment grooves parallel to the optical fibers, and an optical fiber fixing plate for fixing the mounted optical fibers to a substrate; an optical waveguide device chip having an input/output optical waveguide array consisting of optical waveguides corresponding to the optical fibers, for coupling with the optical fibers, and alignment holes; and an alignment platform having first alignment ridges separated by the same spacing as the alignment grooves, for coupling with the alignment grooves, alignment bumps in positions corresponding to the alignment holes, for coupling with the alignment holes, and a space between the first alignment ridges for preventing the optical fiber plate of the optical fiber block array from contacting the alignment platform. The optical fiber passive alignment apparatus does not require a light source and a photodetector, or precise alignment with respect to an alignment axis having six degrees of freedom, so that less time and cost are required for attaching optical fibers to the optical waveguide device chip.

12 Claims, 3 Drawing Sheets

OPTICAL FIBER PASSIVE ALIGNMENT APPARATUS USING ALIGNMENT PLATFORM

BACKGROUND OF THE INVENTION

1. Field of the Invention

The present invention relates to an apparatus for passively aligning an optical fiber with an input/output optical waveguide, and more particularly, to an apparatus for passively aligning an optical fiber with an input/output optical waveguide of an integrated optical device in which optical waveguide devices having various functions are integrated in a planar substrate, using an alignment platform.

2. Description of the Related Art

In general, an active alignment method is used to attach an optical fiber to an optical waveguide device. In the active alignment method, after incident light is waveguided to the optical fiber or the optical waveguide device, the position of the optical fiber is precisely adjusted while measuring optical power at the optical waveguide or output port of the optical fiber. Then, the optical fiber and the optical waveguide are fixed at the position of maximum coupling. Meanwhile, in a passive alignment method, the optical fiber and the optical waveguide are automatically and precisely aligned according to the shape or structure of a coupling portion, while passing any light through the optical fiber or waveguide.

The active alignment method requires a light source and a photodetector in order to align the optical fiber and the optical waveguide. Also, the optical fiber and the optical waveguide must be precisely aligned, with submicron accuracy with respect to an alignment axis having six degrees of freedom. Thus, the alignment is difficult and time consuming.

SUMMARY OF THE INVENTION

To solve the above problems, it is an objective of the present invention to provide an optical fiber passive alignment apparatus for easily aligning an optical fiber and an optical waveguide using an alignment platform having alignment bumps and alignment ridges, capable of reducing the time and costs required for attaching the optical fiber to an optical waveguide device chip.

To achieve the objective of the present invention, there is provided an optical fiber passive alignment apparatus for passively aligning optical fibers with input/output optical waveguides of an integrated optical device, comprising: an optical fiber array block on which the optical fibers are mounted with a predetermined spacing, having alignment grooves formed parallel to the optical fibers, at a predetermined spacing, and an optical fiber fixing plate for fixing the mounted optical fibers to a substrate; an optical waveguide device chip having an input/output optical waveguide array consisting of optical waveguides corresponding to the optical fibers, to be coupled with the optical fibers, and alignment holes; and an alignment platform having first alignment ridges separated by the same spacing as the alignment grooves, to couple with the alignment grooves, alignment bumps formed in positions corresponding to the alignment holes, to couple with the alignment holes, and a space between the first alignment ridges for preventing the optical fiber fixing plate of the optical fiber array block from contacting the alignment platform.

Preferably, the optical fiber passive alignment apparatus further comprises a second optical fiber array block coupled to the other side of the optical waveguide device chip, which is the same as the optical fiber array block, wherein the alignment platform has second alignment ridges to couple with the second optical fiber array block, at the end of the alignment platform opposite to the first alignment ridges, and a space between the second displacement ridges for preventing the second array block from contacting the alignment platform.

BRIEF DESCRIPTION OF THE DRAWINGS

The above objective and advantages of the present invention will become more apparent by describing in detail preferred embodiments thereof with reference to the attached drawings in which.

DESCRIPTION OF THE PREFERRED EMBODIMENTS

Figure 1:
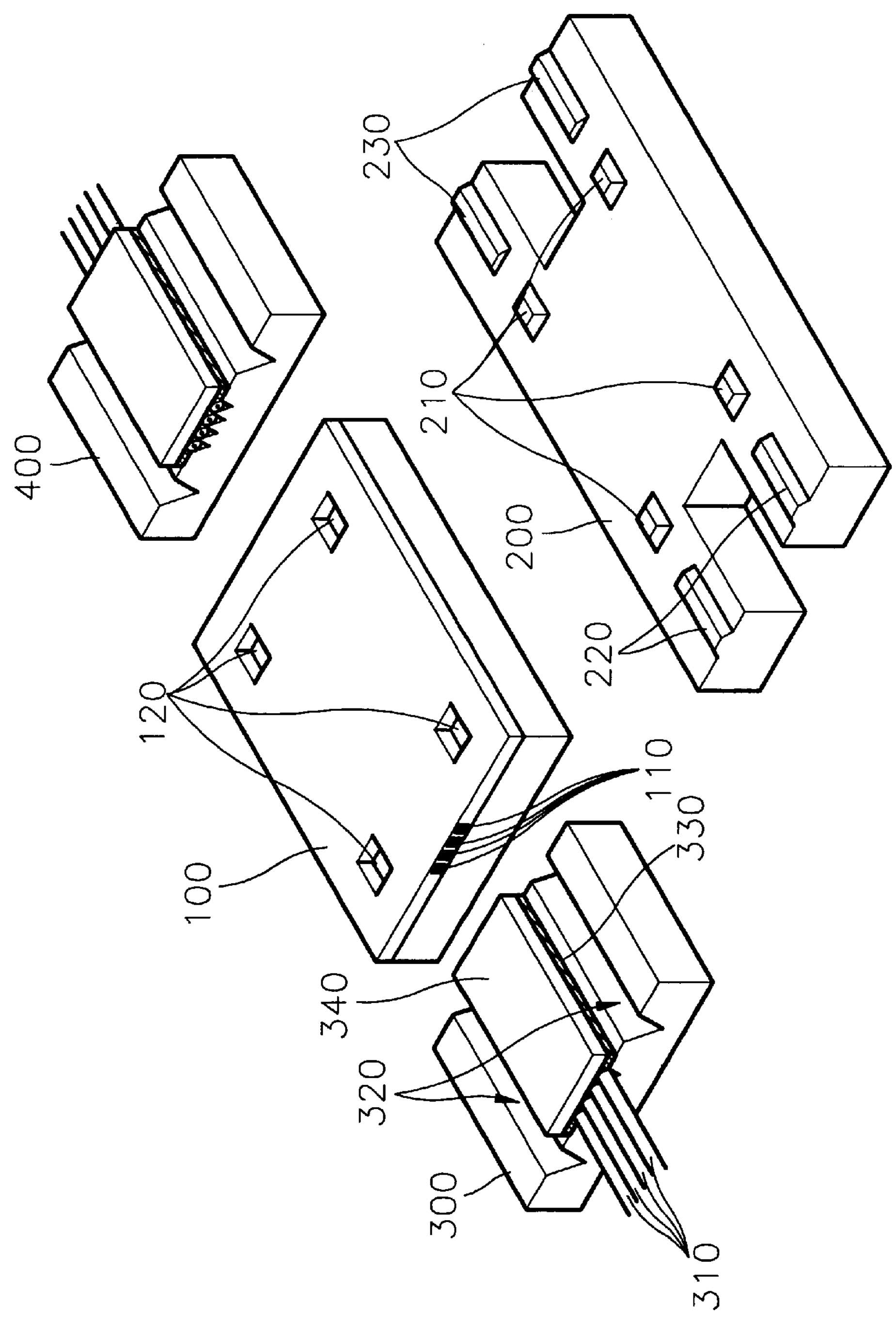
FIG. 1 is a diagram showing the structure of an optical fiber passive alignment apparatus using an alignment platform, according to a preferred embodiment of the present invention.

Referring to FIG. 1, an optical fiber passive alignment apparatus according to a preferred embodiment of the present invention includes an alignment platform 200 having alignment bumps and alignment ridges, an optical fiber array block 300 having alignment grooves, and an optical waveguide device chip 100 having alignment holes.

The alignment platform 200 has alignment bumps 210 and alignment ridges 220 at predetermined locations on its surface as shown in FIG. 1. According to a method for forming this block using a silicon (Si) substrate, a strip pattern having a suitable width and length is formed of $SiO_2$ or $Si_3N_4$ in a portion where the alignment bumps and alignment ridges will be formed, by photolithography, and then wet-etched in potassium hydroxide (KOH) solution. This method is used for forming V-shaped grooves in the Si for aligning optical fibers in an array form at a predetermined spacing. Here, by using a (100) surface of the Si crystalline substrate and anisotropic etching characteristics, bumps and ridges having triangular or trapezoidal cross-sections can be obtained. Alternatively, the alignment ridges and bumps may be formed of various materials by precise mechanical machining or precise molding. Also, the shapes of the bumps and ridges formed on the alignment platform 200 may be modified according to the purpose for use. Also, a portion between the ridges 220 formed on the alignment platform is removed such that an optical fiber fixing plate 340 does not bump against the alignment platform 200 when the optical fiber block 300 is coupled with the alignment platform 200.

Figure 2A:
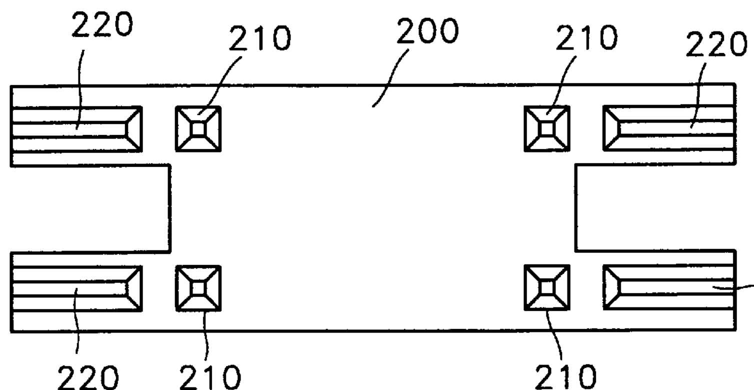
FIGS. 2A, 2B and 2C are plan, front and side views of an example of an alignment platform according to the present invention.
Figure 2C:
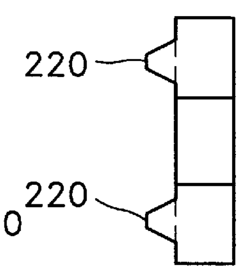
Figure 2B:
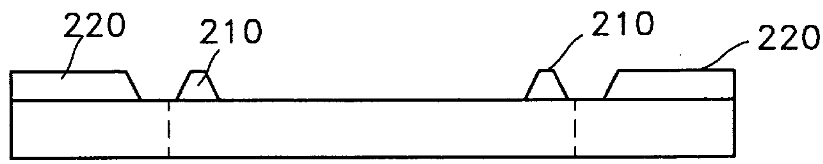

FIGS. 2A, 2B and 2C are plan, front and side views of the alignment platform 200 according to a preferred embodiment of the present invention.

The optical fiber array block 300, on which the optical fibers are mounted at a uniform interval, includes alignment grooves 320, parallel to the optical fibers and having a predetermined length, and the optical fiber fixing plate 340 for fixing the mounted optical fibers to the substrate. That is, the optical array block 300 has an array of V-shaped grooves, for arranging a plurality optical fibers 310 at a predetermined spacing, and the alignment grooves 320 having a predetermined depth and the same separation as the alignment ridges 220, one on each of the array of the V-shaped grooves for supporting the optical fibers.

A method for manufacturing the optical fiber array block 300 having the alignment grooves 320 according to a preferred embodiment of the present invention will be described. A Si crystalline substrate is used. First, $SiO_2$ or $Si_3N_4$ is deposited on the (100) Si substrate, patterned by photolithography, according to a strip pattern, to have a proper width, and then wet-etched in KOH solution. Simultaneously, the alignment grooves 320 can be manufactured by the same method as the array of V-shaped grooves for supporting the optical fibers 310.

Figure 3A:
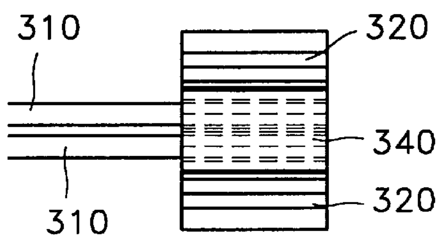
FIGS. 3A, 3B and 3C are plan, front and side views of an example of an optical fiber array block according to the present invention.
Figure 3C:
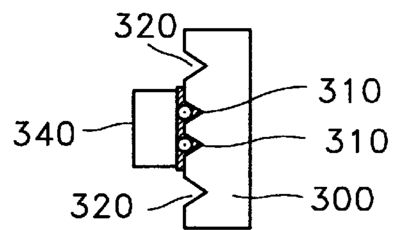
Figure 3B:
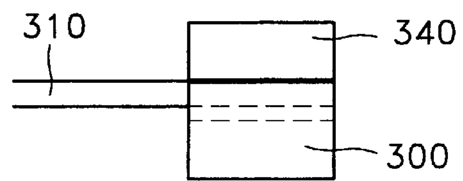

FIGS. 3A, 3B and 3C are plan, front and side views of an example of the optical fiber array block 300 according to the present invention.

In general, the cladding diameter of each optical fiber 310 is 125 $\mu$m, and the spacing of the V-shaped grooves for supporting the optical fibers is 250 $\mu$m. After manufacturing the optical fiber array block 300, the optical fibers 310 are put in the V-shaped grooves for supporting the optical fibers, an optical adhesive agent 330 is deposited thereon, and then the optical fiber fixing plate 340 is put thereon, thereby fixing the optical fibers. The mating surface of the optical array block 300 is polished to minimize coupling loss when an optical waveguide of the optical waveguide device 100 is coupled with the optical fibers 310. The optical fiber array block 300 having the alignment grooves 320 may also be formed of various materials, by precise mechanical machining or precise molding instead of the above method. Also, the shapes of the alignment grooves 310 may be modified according to the purpose for use.

The optical waveguide device chip 100, which is formed from a typical optical waveguide device, has alignment holes 120 of a predetermined depth at both sides of the input/output optical waveguide array 110, corresponding to the locations of the alignment bumps 210 on the alignment platform 200.

Figure 4A:
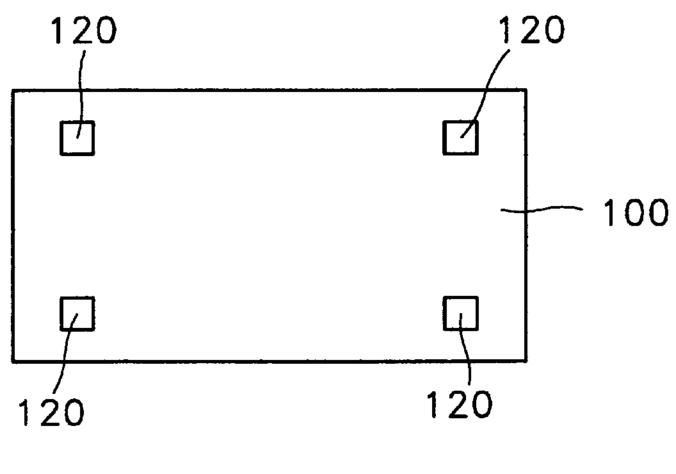
FIGS. 4A, 4B and 4C are plan, front and side views of an example of an optical waveguide device chip according to the present invention.
Figure 4C:
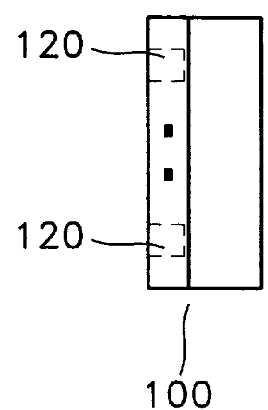
Figure 4B:
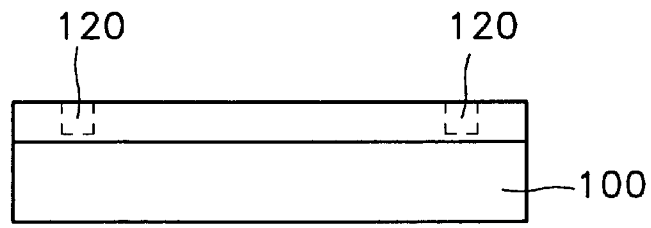

FIGS. 4A, 4B and 4C are plan, front and side views of an example of the optical waveguide device chip 100 according to the present invention.

A method for manufacturing the optical waveguide device chip 100 having the alignment holes 120 according to an example of the present invention will be described. First, a silica layer to be lower cladding is formed on a Si substrate by flame hydrolysis deposition (FHD), and then a silica layer to be a core is formed thereon, of a material having a higher refractive index than the cladding, by the FHD. Then, photolithography and reactive ion etching (RIE) are performed, thereby manufacturing a channel type optical waveguide. The spacing of the optical waveguides within an input/output optical waveguide array 110 is made equal to the spacing of the optical fiber supporting V-shaped grooves of the optical fiber array block 330, that is, the spacing of the optical fibers 310, e.g., 250 $\mu$m. Then, a silica layer for upper cladding is formed by FHD, thereby completing the optical waveguide device. The silica layer is partially removed from the obtained optical waveguide device by photolithography, to form several adjustment holes 120 of a predetermined shape, at locations separated from the input/output optical waveguide array 110 by a predetermined distance, thereby completing the optical waveguide device chip 100. Here, the locations of the alignment holes 120 correspond to the locations of the alignment bumps 210 for alignment of the alignment platform 200. Also, the mating surface of the optical waveguide device chip 100 is polished such that coupling loss is minimized when the input/output optical waveguide array 110 of the optical waveguide device chip is coupled with the optical fibers 310.

The optical waveguide device chip 100 having the alignment holes 120 may contain optical waveguide devices formed of various materials, such as polymer optical waveguides, glass optical waveguides and lithium niobate ($LiNbO_3$) waveguides, as well as the silica optical waveguides.

The alignment holes 120 may be formed on the optical waveguide device chip 100 by dry etching such as RIE or precise mechanical machining, instead of the above method. The shape of the alignment holes 120 may be modified into various shapes to allow stable coupling with the alignment bumps 210 of the alignment platform 200.

A passive alignment method for aligning optical fibers with the optical waveguides through coupling of the optical waveguide device chip 100, the alignment platform 200 and the optical fiber array block 300 will be described. Such coupling of the three elements occurs on the alignment platform 200. First, the optical waveguide device chip 100 is mounted upside down on the alignment platform 200 such that the alignment holes 120 of the optical waveguide device chip 100 couple with the alignment bumps 210 of the alignment platform 200. In this mounted state, the optical waveguide device chip 100 is fixed to the alignment platform 200.

Then, the optical fiber array block 300 is mounted upside down on the alignment platform 200, such that the alignment grooves 320 of the optical fiber array block 300 couple with the alignment ridges 220 of the alignment platform 200. Then, the optical fiber array block 300 is pushed tightly against the mounted optical waveguide device chip 100.

In this state where the three elements are coupled together, core centers of the optical fibers 310 exactly match core centers of the waveguides of the input/output waveguide array 110 in all directions. For matching in the lateral direction, the position of the alignment grooves 320 relative to the optical fibers 310 of the optical fiber array block 300 is matched with the position of the waveguides of the input/output optical waveguide array 110 relative to the alignment holes 120 of the optical waveguide device chip 100 mounted on the alignment platform 200. As a result, the core centers are smoothly matched by mounting the optical fiber array block 300 on the alignment platform such that the alignment grooves 320 couple with the alignment ridges 220. For matching in the vertical direction, the depth of the alignment grooves 320 formed in the optical fiber array block 300 and the depth of the alignment holes 120 in the optical waveguide device chip 100 are controlled, such that the cores of the optical fibers 310 are smoothly aligned with the cores of the waveguides of the optical waveguide array 110 when mounting the alignment grooves 320 of the optical fiber array block 300 and the alignment holes 120 of the optical waveguide device chip 100 on the alignment ridges 220 and the alignment bumps 210 of the alignment platform 200.

After mounting the optical fiber array block 300 and the optical waveguide device chip 100 on the alignment platform 200, the coupling is permanently maintained using an optical adhesive agent, or by welding a metal previously deposited on the mating surfaces of the optical fiber array block 300 and the optical waveguide device chip 100.

The optical fiber passive alignment apparatus further includes a second optical fiber array block 400 coupled with the other side of the optical waveguide device chip 100, which is the same as the optical fiber array block 300. Also, the alignment platform 200 of the optical fiber passive alignment apparatus further includes second alignment ridges 230 at its other end, to couple with the second optical fiber array block 400, and a space between the second alignment ridges 230, which prevents contact with the alignment platform 200 when the second optical fiber array block 400 is mounted on the alignment platform 200. The manufacturing method for the second optical fiber array block 400, and operation principle thereof, are the same as described above, and thus explanation thereof will be omitted.

Therefore, the optical fibers can be easily aligned with optical waveguides by the optical fiber passive alignment apparatus according to the present invention.

Also, the optical fiber passive alignment apparatus does not require a light source and a photodetector, and alignment with submicron accuracy with respect to an alignment axis having six degrees of freedom, as are essential for the active alignment, so that less time and cost are required for attaching the optical fibers to the optical waveguide device chip.

What is claimed is:

1. An optical fiber passive alignment apparatus for passively aligning optical fibers with input/output optical waveguides of an integrated optical device, comprising:

an optical fiber array block on which the optical fibers are mounted with a uniform spacing, having alignment grooves parallel to the optical fibers, at a uniform spacing, and an optical fiber fixing plate for fixing the mounted optical fibers to the optical fiber array block;

an optical waveguide device chip having an input/output optical waveguide array including optical waveguides corresponding to the optical fibers, to be coupled with the optical fibers, and alignment holes; and an alignment platform having first alignment ridges separated by the same spacing as the alignment grooves, and for coupling with the alignment grooves when the optical fiber array block is mounted on the alignment platform, alignment bumps located in positions corresponding to the alignment holes, for coupling with the alignment holes when the optical waveguide device chip is mounted on the alignment platform, the alignment platform having a recess between the first alignment ridges for preventing the optical fiber plate of the optical fiber array block from contacting the alignment platform when the optical fiber array block is mounted on the alignment platform.

2. The optical fiber passive alignment apparatus of claim 1, wherein the alignment platform is formed by forming a pattern having a width and a length on a portion of a silicon substrate where the alignment bumps and first alignment ridges are to be formed, by photolithography, and then wet-etching in a potassium hydroxide (KOH) solution.

3. The optical fiber passive alignment apparatus of claim 2, wherein the silicon substrate is a monocrystalline substrate having a (100) surface and anisotropic etching is used in order to form the alignment bumps and first alignment ridges with a triangular or trapezoidal cross-section.

4. The optical fiber passive alignment apparatus of claim 2, wherein the optical fiber array is formed by depositing $SiO_2$ or $Si_3N_4$ on a (100) silicon substrate, removing $SiO_2$ or $Si_3N_4$ in a strip pattern, having a width, by photolithography, and then wet-etching in a potassium hydroxide (KOH) solution.

5. The optical fiber passive alignment apparatus of claim 2, wherein each of the alignment grooves in the optical fiber array block has a V-shaped cross-section.

6. The optical fiber passive alignment apparatus of claim 2, wherein the alignment holes of the optical waveguide device chip have a depth, and are located in positions corresponding to the positions of the alignment bumps.

7. The optical fiber passive alignment apparatus of claim 2, wherein the optical waveguide device chip is formed by:

forming a lower cladding layer on a substrate;

forming a core layer of a material having a higher refractive index than the lower cladding layer, and forming a channel type optical waveguide by etching;

fabricating an optical waveguide device by forming an upper cladding layer; and forming the alignment holes on the optical waveguide device, at positions separated from the input/output optical waveguide array.

8. The optical fiber passive alignment apparatus of claim 1, wherein the optical fiber array block is formed by precise mechanical machining or molding.

9. The optical fiber passive alignment apparatus of claim 7, wherein the optical waveguide is selected from the group consisting of a silica optical waveguide, a polymer optical waveguide, a glass optical waveguide, and a lithium niobate waveguide.

10. The optical fiber passive alignment apparatus of claim 1, wherein the alignment holes of the optical waveguide device chip are formed by precise mechanical machining.

11. The optical fiber passive alignment apparatus of claim 1, wherein the optical waveguide device chip, the optical fiber array block, and the alignment platform are joined together by one of an optical adhesive agent and welding.

12. The optical fiber passive alignment apparatus of claim 1, further comprising a second optical fiber array block coupled to the optical waveguide device chip, wherein the alignment platform has second alignment ridges for coupling with the second optical fiber array block at the end of the alignment platform opposite the first alignment ridges, and a space between the second alignment ridges, for preventing the second array block from contacting the alignment platform.

* * * * *